(12) United States Patent
Minami

(10) Patent No.: US 11,069,911 B2
(45) Date of Patent: Jul. 20, 2021

(54) FUEL CELL SYSTEM AND CONTROL METHOD OF FUEL CELL SYSTEM

(71) Applicant: TOYOTA JIDOSHA KABUSHIKI KAISHA, Toyota (JP)

(72) Inventor: Shinji Minami, Okazaki (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 98 days.

(21) Appl. No.: 16/216,063

(22) Filed: Dec. 11, 2018

(65) Prior Publication Data

US 2019/0190046 A1 Jun. 20, 2019

(30) Foreign Application Priority Data

Dec. 19, 2017 (JP) .............................. JP2017-242384

(51) Int. Cl.
*H01M 8/04858* (2016.01)
*H01M 8/04537* (2016.01)
*H01M 8/04223* (2016.01)
*H01M 8/1018* (2016.01)

(52) U.S. Cl.
CPC ... *H01M 8/04873* (2013.01); *H01M 8/04223* (2013.01); *H01M 8/04238* (2013.01); *H01M 8/04559* (2013.01); *H01M 8/04611* (2013.01); *H01M 8/04865* (2013.01); *H01M 2008/1095* (2013.01)

(58) Field of Classification Search
CPC ................................................. H01M 8/04238
See application file for complete search history.

(56) References Cited

U.S. PATENT DOCUMENTS

2015/0125772 A1   5/2015  Matsusue et al.

FOREIGN PATENT DOCUMENTS

| JP | 2010-003586 A | 1/2010 |
|---|---|---|
| JP | 2010-040285 A | 2/2010 |
| JP | 2014-078412 | 5/2014 |
| WO | WO 2013/128610 | 9/2013 |

*Primary Examiner* — James Lee
(74) *Attorney, Agent, or Firm* — Finnegan, Henderson, Farabow, Garrett & Dunner, LLP

(57) ABSTRACT

A fuel cell system includes: a fuel cell; a voltage regulator that regulates an output voltage of the fuel cell; and a controller configured to perform a refresh process of decreasing the output voltage of the fuel cell to a reduction voltage at which an oxide film formed on the cathode is reduced, by controlling the voltage regulator. The controller, before the refresh process, calculates a first amount, the first amount being an amount by which the oxide film is to be removed from the cathode. The controller determines, as the output voltage of the fuel cell, a refresh voltage that enables the first amount of the oxide film to be removed within a preset reference time. The controller operates the voltage regulator so as to cause the output voltage of the fuel cell to become the refresh voltage when the refresh process is performed.

6 Claims, 9 Drawing Sheets

FUEL CELL SYSTEM AND CONTROL METHOD OF FUEL CELL SYSTEM

INCORPORATION BY REFERENCE

The disclosure of Japanese Patent Application No. 2017-242384 filed on Dec. 19, 2017 including the specification, drawings and abstract is incorporated herein by reference in its entirety.

BACKGROUND

1. Technical Field

The disclosure relates to a fuel cell system and a control method of a fuel cell system.

2. Description of Related Art

In a process of a fuel cell continuing generating power, there may be cases where the electric power generation performance of the fuel cell gradually decreases. As one of causes of the decrease in the electric power generation performance as described above, a phenomenon is known in which an oxide film is formed in a catalyst layer provided in a cathode of the fuel cell due to power generation. As a method of removing the oxide film to recover the electric power generation performance, a method is known in which a process of decreasing a voltage of the fuel cell to reduce oxide film (refresh process) is performed (for example, refer to WO 2013/128610).

SUMMARY

In the refresh process, in a case where the voltage of the fuel cell is greatly changed, the electric power generation performance of the fuel cell may further decrease in some cases, so that a further optimizing of conditions of the refresh process is desirable.

A first aspect of the disclosure relates to a fuel cell system including: a fuel cell including an electrolyte membrane, an anode, and a cathode; a voltage regulator configured to regulate an output voltage of the fuel cell; and a controller configured to perform a refresh process of decreasing the output voltage of the fuel cell to a reduction voltage at which an oxide film formed on the cathode is reduced, by controlling the voltage regulator. The controller is configured to, before the refresh process, calculate a first amount based on the output voltage of the fuel cell and a time. The first amount is an amount by which the oxide film is to be removed from the cathode. The controller is configured to, before the refresh process, determine, as the output voltage of the fuel cell, a refresh voltage that enable the first amount of the oxide film to be removed within a preset reference time. The controller is configured to operate the voltage regulator so as to cause the output voltage of the fuel cell to become the refresh voltage when the refresh process is performed. With the fuel cell system according to the first aspect of the disclosure, the conditions for the refresh process can be further optimized. Specifically, in the fuel cell system according to the first aspect of the disclosure, when the refresh process is performed, the controller determines the refresh voltage such that removal of the first amount calculated by the controller can be performed within the preset reference time. Therefore, compared to a case where the first amount of the oxide film is removed by the refresh process for a longer period of time than the reference time, deterioration of the cathode due to the refresh process can be suppressed, and as a result, deterioration of the electric power generation performance of the fuel cell due to the refresh process can be suppressed.

The controller may be configured to calculate the first amount such that an amount that causes a portion of the oxide film formed on the cathode before the refresh process is performed remains on the cathode after the refresh process is performed. In the manner described above, it is possible to suppress a progress of the deterioration of the cathode due to the amount of the oxide excessively removed from the cathode by the refresh process and a further decrease in the electric power generation performance of the fuel cell.

The controller may be configured to calculate a second amount that is an amount of the oxide film that has been formed on the cathode, and calculate the first amount by subtracting a third amount from the second amount, the third amount being determined in advance as an amount of the portion of the oxide film that is to remain after the refresh process to suppress deterioration of the fuel cell. In the manner described above, the effect of further suppressing the deterioration of the cathode due to the refresh process can be further enhanced.

The controller may be configured to calculate the third amount by subtracting an amount by which oxide film is removed from the cathode when the refresh process is performed at a predetermined lower limit voltage and for a predetermined lower limit time, from a maximum value of an amount of the oxide film formed on the cathode. In the manner described above, the effect of further suppressing the deterioration of the cathode due to the refresh process can be further enhanced.

The fuel cell system may further include: a voltage sensor configured to detect the output voltage of the fuel cell; a timer configured to measure a holding time during which the output voltage of the fuel cell is held at a constant value; a first storage portion configured to store a first relationship that is a relationship among the output voltage of the fuel cell, the holding time, and an amount of the oxide film formed; and a second storage portion configured to store a second relationship that is a relationship among the output voltage of the fuel cell, the holding time, and an amount by which the oxide film is removed. The controller may be configured to calculate the second amount by calculating and integrating the amount of the oxide film formed on the cathode and the amount by which the oxide film is removed from the cathode with time based on the detected output voltage, the measured holding time, the first relationship, and the second relationship. In the manner described above, the amount of the oxide film formed on the cathode can be accurately calculated.

The fuel cell system may further include a third storage portion configured to store a third relationship that is a relationship among the output voltage of the fuel cell when the refresh process is performed, a time during which the refresh process is performed, and an amount by which the oxide film is removed by the refresh process. The controller may be configured to determine, based on the third relationship, the refresh voltage that enables the first amount of the oxide film to be removed from the cathode within the reference time. In the manner described above, the controller can appropriately determine the output voltage for removing the amount of the oxide film calculated by the controller as the first amount by which the oxide film is to be removed from the cathode, within the reference time.

A second aspect of the disclosure relates to a control method for a fuel cell system including a fuel cell including an electrolyte membrane, an anode, and a cathode. The control method includes calculating a first amount based on an output voltage of the fuel cell and a time during which electric power has been output from the fuel cell. The first amount is an amount by which an oxide film is to be removed from the cathode. The control method includes determining, as the output voltage of the fuel cell, a refresh voltage that enables the first amount of the oxide film to be reduced and removed within a preset reference time; and regulating the output voltage of the fuel cell to be the refresh voltage.

The disclosure can be realized in various forms other than those described above, and can be realized in forms such as a moving body on which the fuel cell system is mounted as a driving power source, a computer program realizing the control method, and a non-transitory recording medium having the computer program recorded thereon.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

A. Overview of Fuel Cell System

Figure 1:
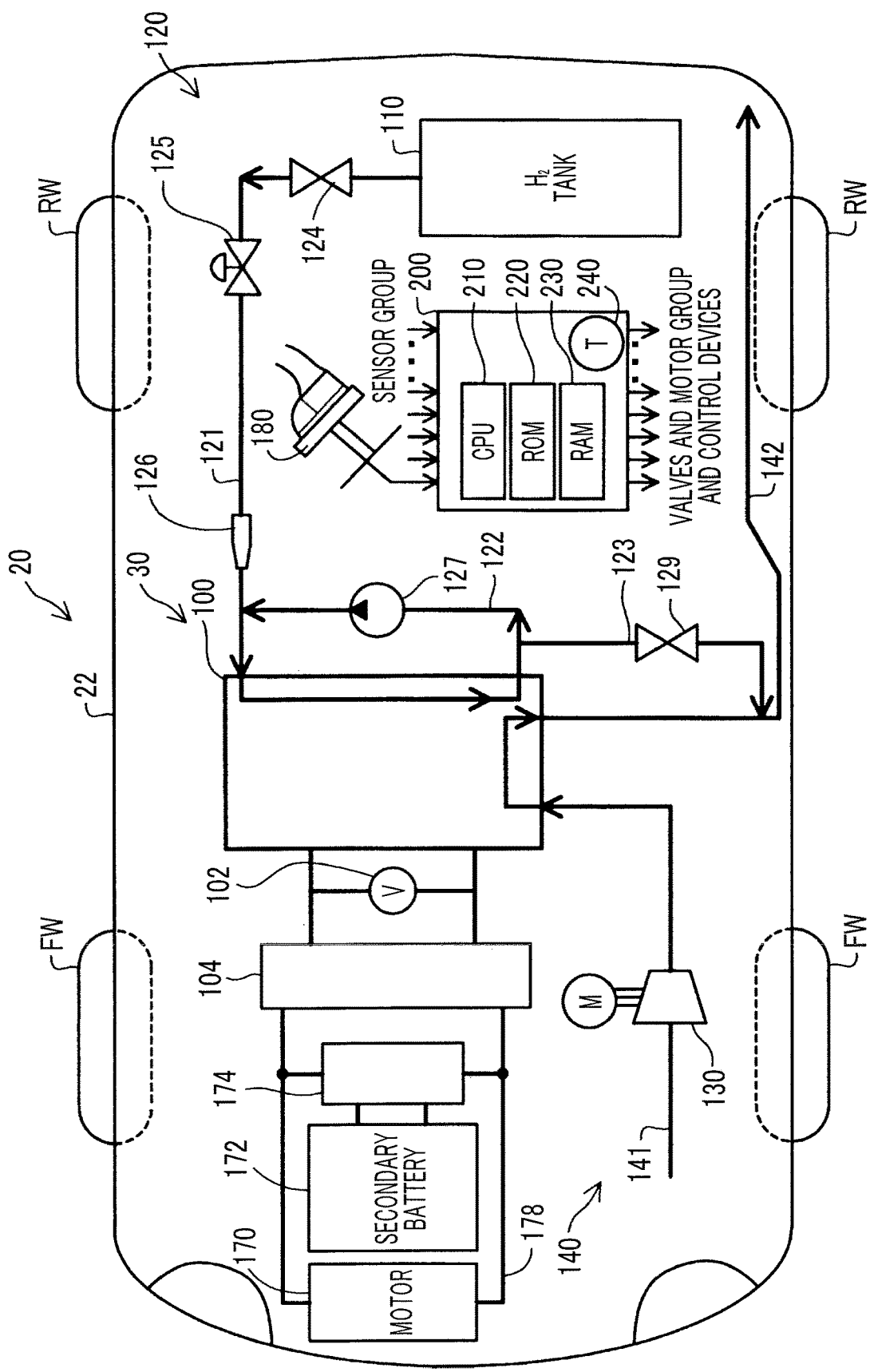
FIG. 1 is a block diagram showing a schematic configuration of a fuel cell vehicle.

FIG. 1 is a block diagram showing a schematic configuration of a fuel cell vehicle 20 according to an embodiment. The fuel cell vehicle 20 includes a fuel cell system 30 mounted on a vehicle body 22. The fuel cell system 30 and a driving motor 170 of the fuel cell vehicle 20 are connected with wiring 178, and electric power is exchanged between the fuel cell system 30 and the motor 170 via the wiring 178.

The fuel cell system 30 includes a fuel cell 100, a fuel gas supply section 120 including a hydrogen tank 110, an oxidizing gas supply section 140 including a compressor 130, a secondary battery 172, a DC/DC converter 104, a DC/DC converter 174, and a controller 200. The fuel cell system 30 further includes a coolant circulation section (not shown) that causes a coolant for cooling the fuel cell to be circulated through the fuel cell in order to maintain a temperature of the fuel cell 100 in a predetermined range. In the fuel cell system 30, the fuel cell 100 and the secondary battery 172 can each independently or simultaneously supply electric power to a load including the motor 170.

The fuel cell 100 has a stack configuration having a plurality of unit cells stacked. The fuel cell 100 of the embodiment is a polymer electrolyte membrane fuel cell. In each of the unit cells constituting the fuel cell 100, a passage through which hydrogen flows to an anode side (hereinafter, also referred to as "anode side passage") and a passage through which oxygen flows to a cathode side (hereinafter, also referred to as "cathode side passage") are formed with an electrolyte membrane interposed therebetween. The fuel cell 100 is connected to the load including the motor 170 via the DC/DC converter 104 and the wiring 178. A voltage of the fuel cell 100 is detected by a voltage sensor 102. A detection signal of the voltage sensor 102 is output to the controller 200.

The DC/DC converter 104 has a function of changing an output voltage of the fuel cell 100 by receiving a control signal of the controller 200. Specifically, the DC/DC converter 104 has a function of setting the output voltage when the fuel cell 100 generates electric power by changing a switching cycle of an internal switching circuit. The DC/DC converter 104 has a function of boosting the output voltage to a desired voltage when the electric power generated by the fuel cell 100 is supplied to the load. In this embodiment, the DC/DC converter 104 is an example of a "voltage regulator".

The hydrogen tank 110 included in the fuel gas supply section 120 is a device that stores a fuel gas containing hydrogen. Specifically, for example, the hydrogen tank may be a hydrogen gas cylinder that stores high-pressure hydrogen gas, or a tank that is provided with a hydrogen occlusion alloy therein and stores hydrogen by occlusion of hydrogen by the hydrogen occlusion alloy. The fuel gas supply section 120 includes a hydrogen supply passage 121 extending from the hydrogen tank 110 to the fuel cell 100, a circulation passage 122 through which an anode off-gas is circulated to the hydrogen supply passage 121, a hydrogen release passage 123 for discharging the anode off-gas to the atmosphere. In the fuel gas supply section 120, the hydrogen gas stored in the hydrogen tank 110 is supplied via an on-off valve 124 and a pressure reducing valve 125 of the hydrogen supply passage 121 from an injector 126 downstream of the pressure reducing valve 125 to the anode side passage of the fuel cell 100. The flow rate of hydrogen circulating through the circulation passage 122 is controlled by a circulation pump 127. Driving amounts of the injector 126 and the circulation pump 127 are controlled by the controller 200 according to a load demand.

A portion of the hydrogen gas flowing through the circulation passage 122 is subjected to adjustment of opening and closing of the on-off valve 129 of the hydrogen release passage 123 which is branched from the circulation passage 122 and is released to the atmosphere at a predetermined timing. Accordingly, impurities (water vapor, nitrogen, and the like) other than hydrogen in the hydrogen gas circulating through the circulation passage 122 can be discharged to the outside of the passage, and an increase in the concentration of impurities in the hydrogen gas supplied to the fuel cell 100 can be further suppressed. The opening and closing timing of the on-off valve 129 is controlled by the controller 200.

The oxidizing gas supply section 140 supplies an oxidizing gas containing oxygen (in this embodiment, air) to the fuel cell 100. The oxidizing gas supply section 140 includes, in addition to the compressor 130, an air passage 141, and an air release passage 142. The air drawn by the compressor 130 is supplied to the cathode side passage in the fuel cell 100 from the air passage 141. A cathode off-gas discharged from the fuel cell 100 is released to the atmosphere via the air release passage 142. The hydrogen release passage 123 is connected to the air release passage 142, and hydrogen released via the hydrogen release passage 123 is diluted with the air flowing through the air release passage 142 before being released to the atmosphere. A driving amount of the compressor 130 is controlled by the controller 200.

The secondary battery 172 is connected to the wiring 178 via the DC/DC converter 174, and the DC/DC converter 174 and the DC/DC converter 104 are connected to the wiring 178 in parallel. As the secondary battery 172, for example, various power storage devices such as a lead storage battery, a nickel-hydrogen battery, and a lithium-ion battery can be adopted. The DC/DC converter 174 receives a control signal of the controller 200 and controls charging or discharging of the secondary battery 172. In a case where there is no need to charge or discharge the secondary battery 172, the DC/DC converter 174 breaks the connection between the secondary battery 172 and the wiring 178.

The controller 200 is configured as a logic circuit primarily including a microcomputer, and includes a central processing unit (CPU) 210, a read only memory (ROM) 220, a random access memory (RAM) 230, an input and output port (not shown), and the like. The controller 200 includes a timer 240, and can measure, for example, a time during which the output voltage of the fuel cell 100 is held at a constant value, using the timer 240. The ROM 220 is an example of a "first storage portion", a "second storage portion", and a "third storage portion". The controller 200 acquires detection signals from various sensors included in the fuel gas supply section 120, the oxidizing gas supply section 140, and the like and performs various controls regarding the fuel cell vehicle 20.

In FIG. 1, the entire fuel cell vehicle 20 is controlled by the controller 200, but another configuration may also be adopted. For example, a controller that controls the fuel cell system 30 and a controller that controls parts other than the fuel cell system 30 in the fuel cell vehicle 20 may be provided separately from each other. In the controller that controls the fuel cell system 30, a controller that performs control regarding a refresh process, which will be described later, may be separately provided.

The fuel cell vehicle 20 of this embodiment switches between a plurality of operation modes including a normal operation mode and an intermittent operation mode during the operation of the fuel cell system 30. The normal operation mode is an operation mode selected in a case where a load demand for the fuel cell system 30 exceeds a preset reference value, and is an operation mode in which at least a portion of the load demand including an electric power demanded by the motor 170 is prepared by the electric power generated by the fuel cell 100. The intermittent operation mode is an operation mode selected when the load demand for the fuel cell system 30 is equal to or less than the preset reference value. In this embodiment, the intermittent operation mode is set when the electric power demanded by the motor 170 is zero (for example, when an accelerator is not operated).

B. Oxide Film Removal Process

Each of the unit cells constituting the fuel cell 100 includes the electrolyte membrane, and the anode and the cathode which are electrodes provided on the electrolyte membrane. Each of the electrodes includes a catalyst. The catalyst may be a noble metal catalyst such as platinum or a platinum alloy, or another kind of catalyst may also be used. In this embodiment, a platinum catalyst is used. When the output voltage of the fuel cell 100 reaches an oxidation voltage (when the cathode reaches an oxidation potential) during the electric power generation by the fuel cell 100, an oxide film is formed on the catalyst provided in the cathode. When the output voltage of the fuel cell 100 reaches a reduction voltage (when the cathode reaches a reduction potential), the oxide film is reduced and removed from the cathode. When the oxide film is formed on the cathode, an effective area of the catalyst decreases, and the electric power generation performance further decreases in some cases. Therefore, in the fuel cell system 30 of this embodiment, a process of removing the oxide film by forcibly decreasing the output voltage of the fuel cell 100 (hereinafter, also referred to as "refresh process") is performed.

Figure 2:
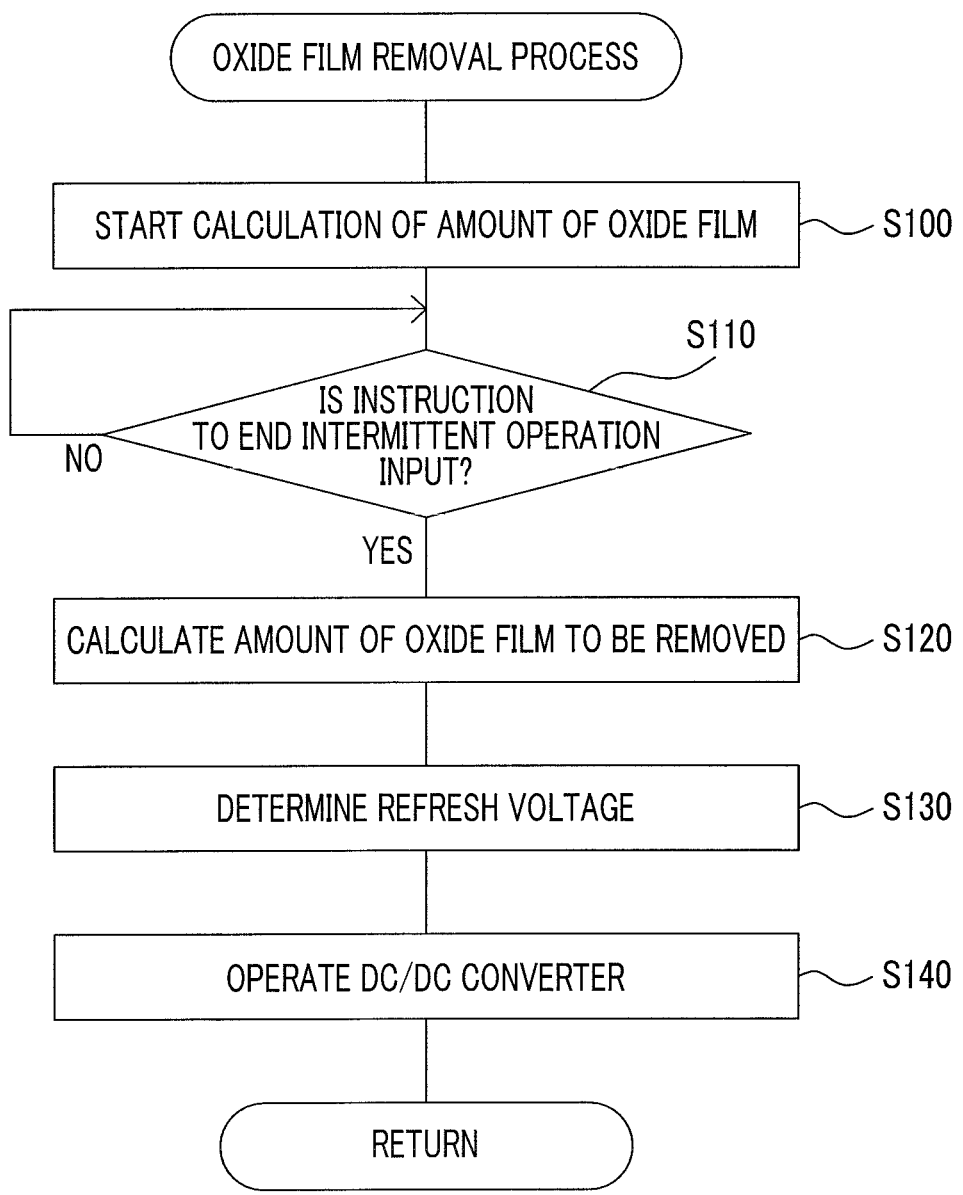
FIG. 2 is a flowchart showing an oxide film removal process routine.

FIG. 2 is a flowchart showing an oxide film removal process routine executed by the CPU 210 of the controller 200. This routine represents operations regarding the refresh process, and is repeatedly executed until a system stop instruction by a user is input after the fuel cell system 30 is started.

When this routine is executed, the CPU 210 starts to calculate the amount of the oxide film formed on the cathode (hereinafter, also referred to as "formed film amount") (step S100). As described above, while the fuel cell 100 generates electric power, the oxide film is formed or the oxide film is removed according to a variation in the output voltage, whereby the formed film amount varies. In this embodiment, when the fuel cell system 30 is started, the amount of the oxide film formed and the amount of the oxide film removed are integrated with time, thereby calculating the formed film amount.

A method of calculating the formed film amount in the cathode is not particularly limited, and the process described below is an example. In this embodiment, the ROM 220 of the controller 200 stores a first relationship and a second relationship regarding the calculation of the amount of the oxide film, for example, as a map in advance. The first relationship is a relationship among the output voltage (cathode potential) of the fuel cell 100, a holding time during which the output voltage is held at a constant value, and the amount of the oxide film formed. The second relationship is a relationship among the output voltage (cathode potential) of the fuel cell 100, the holding time during which the output voltage is held at a constant value, and the amount of the oxide film removed.

In a process of calculating the amount of the oxide film, which is started in step S100, the CPU 210 acquires the output voltage of the fuel cell 100 from the voltage sensor 102 while referring to the first and second relationships stored in the ROM 220 as the first storage portion and the second storage portion, and measures the time during which the acquired output voltage is held, using the timer 240. While the output voltage increases, the amount of the oxide film formed is calculated based on the output voltage, the holding time during which the output voltage is held, and the first relationship. While the output voltage decreases, the amount of the oxide film removed is calculated based on the output voltage, the holding time during which the output voltage is held, and the second relationship. In the manner described above, the amount of the oxide film formed and the amount of the oxide film removed are calculated and integrated with time, whereby the formed film amount of the film formed on the cathode is calculated.

When the fuel cell system 30 is started and step S100 is executed first, the amount of the oxide film formed on the cathode at the time of the start of step S100 may be set to zero. In a case where step S100 is executed the second time or the subsequent times after the fuel cell system 30 is started, the amount of the oxide film formed on the cathode at the time of the start of step S100 may be the amount of the oxide film remaining after a refresh process is performed (for example, deterioration suppression film amount, which will be described later) in a case where the oxide film removal process routine is executed last time. A method of obtaining the first relationship and the second relationship will be described later in detail.

Figure 3:
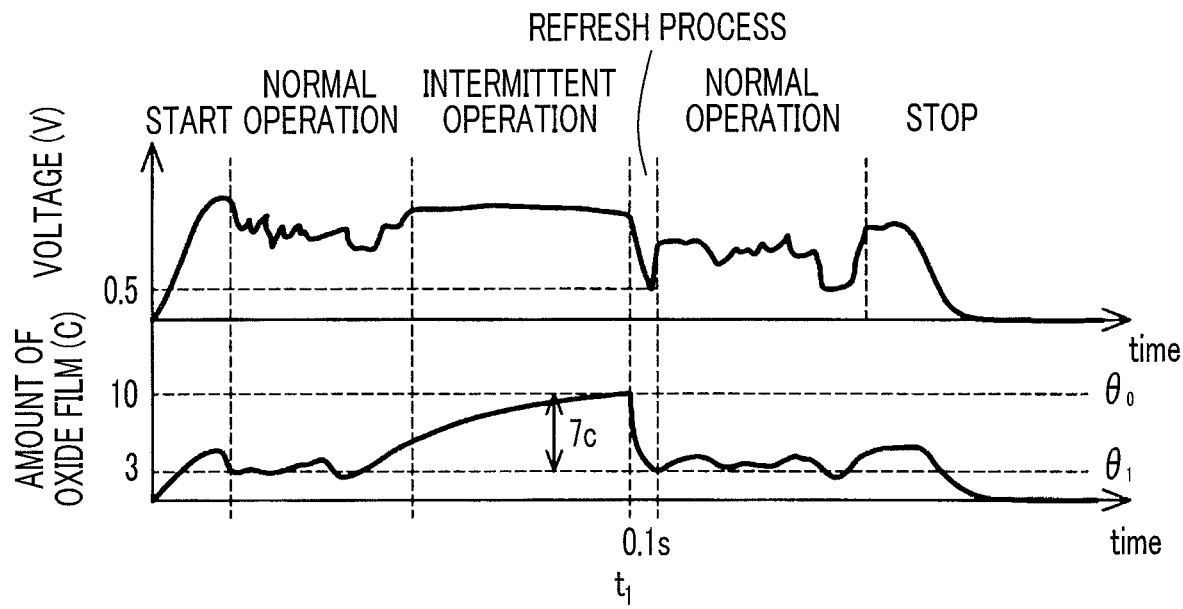
FIG. 3 is an explanatory view showing a temporal change in an output voltage and an amount of an oxide film.
Figure 4:
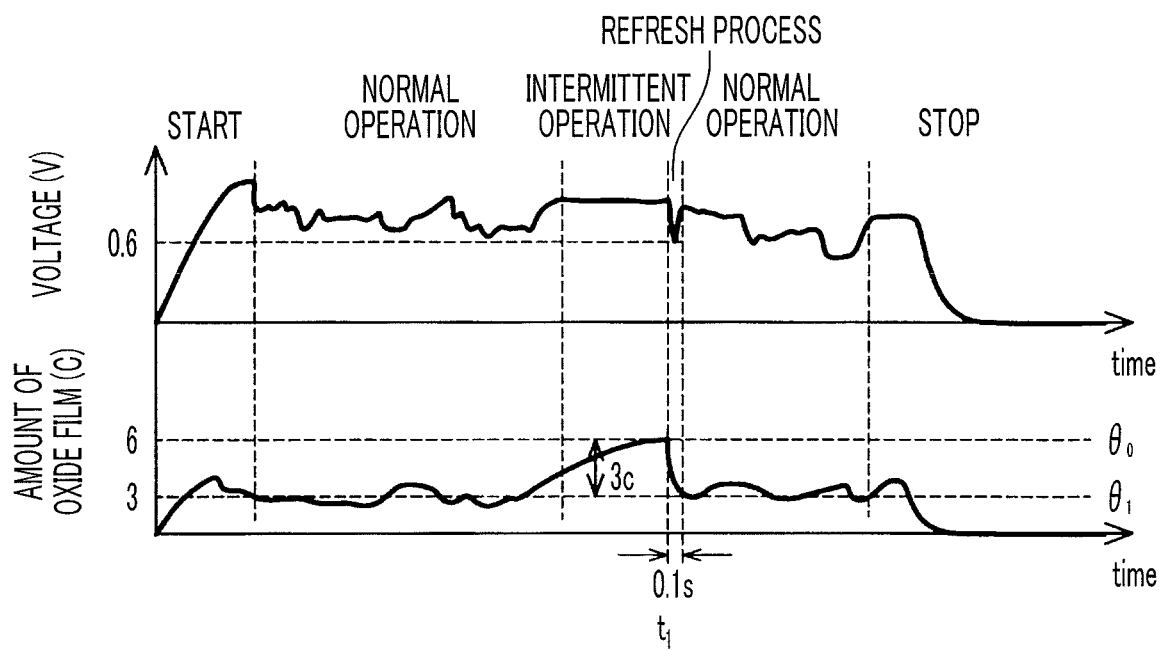
FIG. 4 is an explanatory view showing a temporal change in the output voltage and the amount of the oxide film.

FIGS. 3 and 4 are explanatory views schematically showing examples of temporal changes in the output voltage of the fuel cell 100 and the amount of the oxide film during a period from the start to the stop of the fuel cell system 30. In FIGS. 3 and 4, the amount of the oxide film is expressed as a charge amount (the unit is Coulomb (C)) corresponding to a reaction amount of a reaction for forming the oxide film. In FIGS. 3 and 4, an output voltage per unit cell is shown as the output voltage of the fuel cell 100.

As shown in FIGS. 3 and 4, in a normal operation, the output voltage of the fuel cell 100 varies depending on the load demand, and the amount of the oxide film fluctuates depending on the variation of the output voltage.

In this embodiment, as shown in FIGS. 3 and 4, the output voltage of the fuel cell 100 during an intermittent operation is made constant (in this specification, "constant" includes "substantially constant"). The output voltage is set to a relatively high voltage (for example, 0.6 to 0.9 V per unit cell) so that an output electric power of the fuel cell 100 is sufficiently small and deterioration of the cathode due to a high potential can be suppressed. During the intermittent operation, the output voltage of the fuel cell 100 may be varied. In this case, for example, a process of, at the start of the intermittent operation, temporarily stopping the supply of the fuel gas and the oxidizing gas to the fuel cell to enable generation of a small amount of electric power, and when the output voltage of the fuel cell decreases to a predetermined lower limit due to the electric power generation, temporarily resuming the supply of at least one of the fuel gas and the oxidizing gas to the fuel cell to increase the output voltage again, may be performed. During the intermittent operation, the electric power generation by the fuel cell 100 may be stopped. In this case, from the viewpoint of securing the responsiveness to the load at the time of the end of the intermittent operation and suppressing the deterioration of the cathode due to a high potential, it is desirable that a needed amount of the fuel gas and the oxidizing gas is supplied to the fuel cell 100 to cause an open circuit voltage of the fuel cell 100 to be in a relatively high voltage range (for example, 0.6 to 0.9 V). During the intermittent operation, control may be performed to combine such operation conditions.

While the normal operation and the intermittent operation are performed, in the fuel cell system 30, calculation of the formed film amount started in step S100 is performed.

After starting the calculation of the amount of the oxide film in step S100, the CPU 210 determines whether or not an instruction to end the intermittent operation is input to the fuel cell vehicle 20 (step S110). Specifically, the CPU 210 determines that the instruction to end the intermittent operation is input, for example, when an accelerator operation amount sensor 180 detects the depression of an accelerator after the start of the intermittent operation of the fuel cell vehicle 20. In this embodiment, the refresh process is performed at the time of the end of the intermittent operation, and thereafter, the normal operation is performed. In step S110, the CPU 210 determines whether or not a timing at which the refresh process has to be performed is reached. In FIGS. 3 and 4, the refresh process performed at the time of the end of the intermittent operation (elapsed time $t_1$ from the start) is shown. In this embodiment, step S110 is repeated until the CPU 210 determines that the instruction to end the intermittent operation is input.

When the instruction to end the intermittent operation is input, the CPU 210 calculates the amount by which the oxide film is to be removed by the refresh process (step S120). It is also possible to remove the entire amount of the oxide film formed at the time of the end of the intermittent operation by the refresh process. However, in this embodiment, the amount by which the oxide film is to be removed so as to cause a portion of the oxide film to remain is calculated.

Although the amount of the oxide film to remain after the refresh process is not particularly limited, in this embodiment, amount of the oxide film to remain on the cathode after the refresh process is set to a deterioration suppression film amount ($\theta_1$), and the amount by which the oxide film is to be removed is calculated so as to cause the deterioration suppression film amount ($\theta_1$) to remain after the refresh process. The deterioration suppression film amount ($\theta_1$) is determined in order to suppress the deterioration of the cathode due to excessive removal of the oxide film by the refresh process. In step S120, the CPU 210 calculates the amount by which the oxide film is to be removed from the cathode by subtracting the deterioration suppression film amount ($\theta_1$) from a formed film amount ($\theta_0$) at the time of the end of the intermittent operation calculated by the process of calculating the amount of the oxide film started in step S100. A method of setting the deterioration suppression film amount ($\theta_1$) will be described later in detail.

FIG. 3 shows that the formed film amount ($\theta_0$) at the time of the end of the intermittent operation is 10 C, the deterioration suppression film amount ($\theta_1$) is 3 C, and the amount by which the oxide film is to be removed from the cathode is 7 C. FIG. 4 shows that the formed film amount ($\theta_0$) at the time of the end of the intermittent operation is 6 C, the deterioration suppression film amount ($\theta_1$) is 3 C, and the amount by which the oxide film is to be removed from the cathode is 3 C.

When the amount by which the oxide film is to be removed is calculated in step S120, the CPU 210 determines a voltage (refresh voltage) to be set as the output voltage of the fuel cell 100 during the refresh process (step S130). The refresh voltage is determined as a voltage at which the amount of the oxide film calculated in step S120 can be removed within a preset reference time.

In this embodiment, the ROM 220 of the controller 200 stores a third relationship which is a relationship among the refresh voltage, a refresh time, and the amount of the oxide film removed by the refresh process, for example, as a map in advance. In step S130, the CPU 210 determines the refresh time to be equal to or shorter than the preset reference time, and determines the refresh voltage with reference to the third relationship so that the amount of the oxide film calculated in step S120 can be removed within the refresh time.

Figure 5:
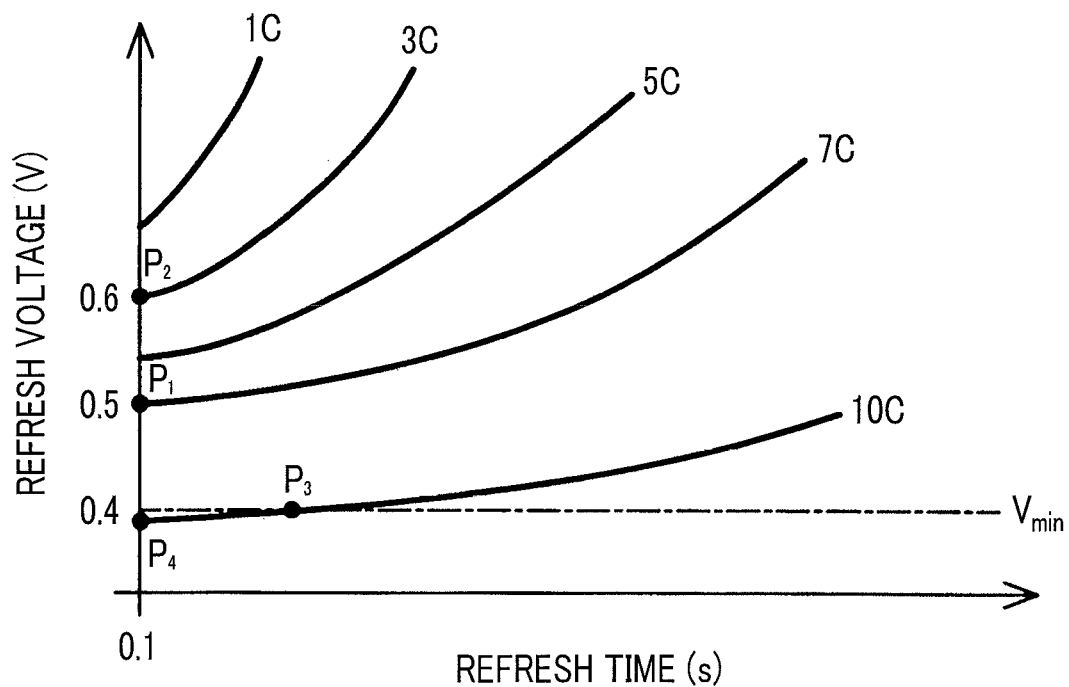
FIG. 5 is an explanatory view schematically showing an example of a third relationship.

FIG. 5 is an explanatory view schematically showing an example of the third relationship. In FIG. 5, the horizontal axis represents the refresh time, and the vertical axis represents the refresh voltage per unit cell. FIG. 5 shows a plurality of (in FIG. 5, representative five) film removal amount equivalent lines by connecting points where the amount of the oxide film removed is the same. As shown in FIG. 5, the longer the refresh time, and the lower the refresh voltage $V_2$, the larger the amount of the oxide film removed.

On the same film removal amount equivalent line, even when the refresh process is performed under any refresh condition (hereinafter, a combination of the refresh voltage and the refresh time is also referred to as "refresh condition"), the amount of the oxide film removed is the same. The refresh time greatly affects the degree of the decrease in the battery performance (deterioration of the cathode) caused by the refresh process even under the refresh condition on the same film removal amount equivalent line. Specifically, as the refresh time decreases, the deterioration of the battery performance is suppressed. In step S130, regarding the third relationship shown in FIG. 5, on the film removal amount equivalent line corresponding to the amount by which the oxide film is to be removed, which is calculated in step S120, the refresh time and the refresh voltage are determined so that the refresh time is equal to or shorter than the preset reference time.

The reference time of the refresh time used to set the refresh voltage in step S130 is not particularly limited, but from the viewpoint of suppressing the decrease in the battery performance (deterioration of the cathode) due to the refresh process, is set to desirably 1.0 second or shorter, more desirably 0.5 seconds or shorter, and even more desirably 0.1 seconds or shorter. A method of obtaining the third relationship and a relationship between the refresh time and the decrease in the battery performance will be described later in detail.

The refresh time can be set to any time as long as the refresh time is equal to or shorter than the reference time described above. In the fuel cell system 30 of this embodiment, a shortest refresh time, which is the lower limit that can be set as the refresh time, is determined in advance. In this embodiment, the shortest refresh time is set as a shortest time determined based on a system configuration as a time during which the refresh process can be performed. In the fuel cell system 30 of this embodiment, the shortest refresh time is set to 0.1 seconds. Hereinafter, the shortest refresh time is also referred to as "lower limit time". From the viewpoint of suppressing the decrease in the battery performance (deterioration of the cathode) due to the refresh process, the refresh time is desirably set to the shortest refresh time described above.

In FIG. 5, as an example of the refresh condition in the example shown in FIG. 3, the refresh condition when the refresh time is set to the shortest refresh time (0.1 seconds) is shown as a condition P1 where the refresh voltage is 0.5 V (the electric quantity required to remove the oxide film to be removed is 7 C). In FIG. 5, as an example of the refresh condition in the example shown in FIG. 4, the refresh condition when the refresh time is set to the shortest refresh time (0.1 seconds) is shown as a condition P2 where the refresh voltage is 0.6 V (the electric quantity required to remove the oxide film to be removed is 3 C).

When the refresh voltage is determined, the CPU 210 operates the DC/DC converter 104 (step S140) so that the output voltage of the fuel cell 100 becomes the refresh voltage determined in step S130 and the refresh time becomes the time corresponding to the refresh voltage, and ends this routine. Accordingly, the refresh process is performed, and the amount of the oxide film calculated in step S120 is removed. When the refresh process is performed, the accelerator is depressed so that an electric power demanded by the motor 170 is present. However, normally the amount of electric power generated during the refresh process is insufficient for the demanded electric power. Therefore, during the refresh process, electric power is supplied from the secondary battery 172 to the motor 170.

C. First Relationship

The first relationship used for calculating the formed film amount in step S110 is, as described above, the relationship among the output voltage (cathode potential) of the fuel cell 100, the holding time during which the output voltage is held at a constant value, and the amount of the oxide film formed. Hereinafter, the method of obtaining the first relationship will be described.

Figure 6A:
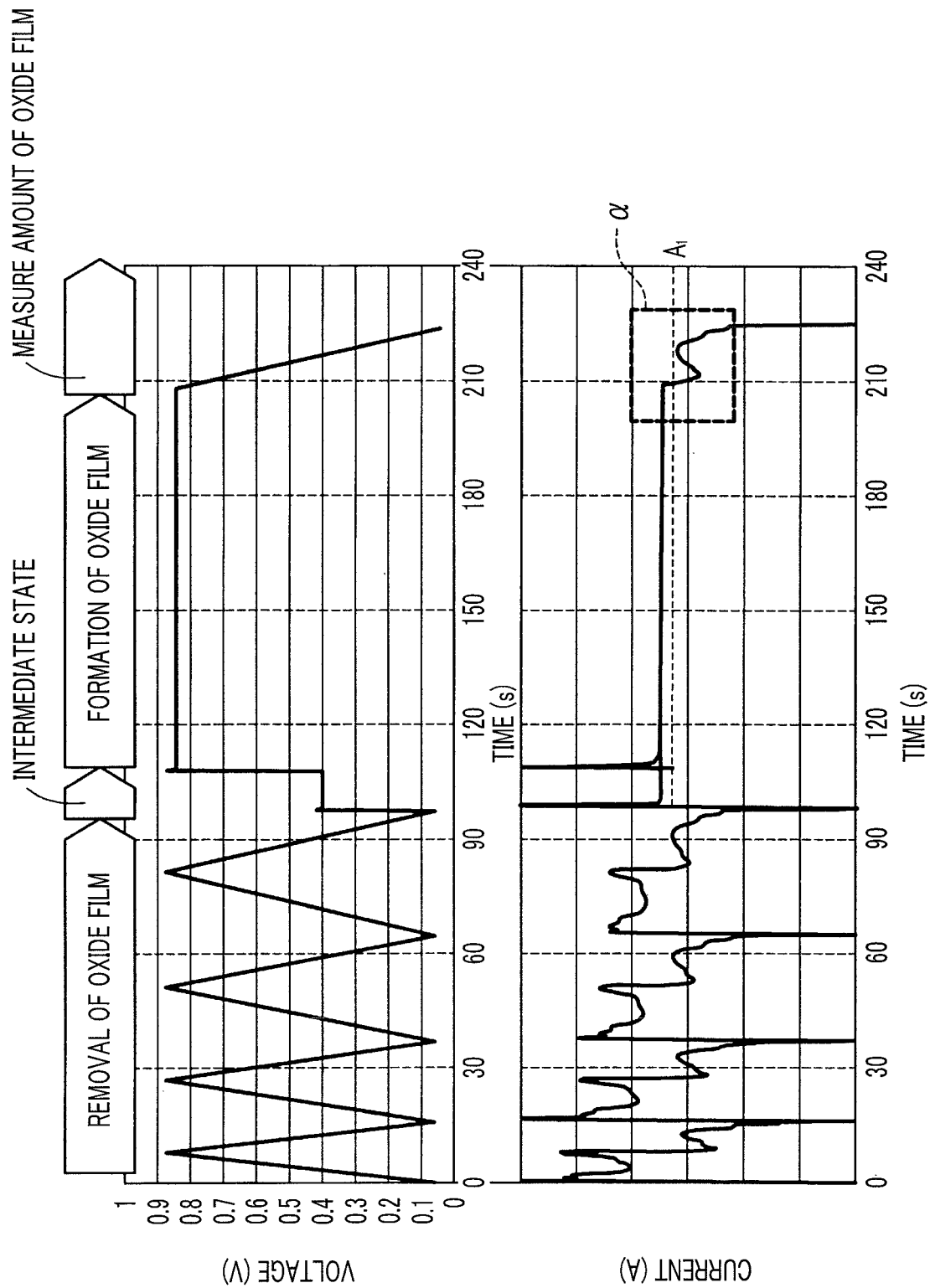
FIG. 6A is an explanatory view showing an example of a method of obtaining a first relationship.
Figure 6B:
FIG. 6B is an explanatory view showing an example of the method of obtaining the first relationship.
Figure 7:
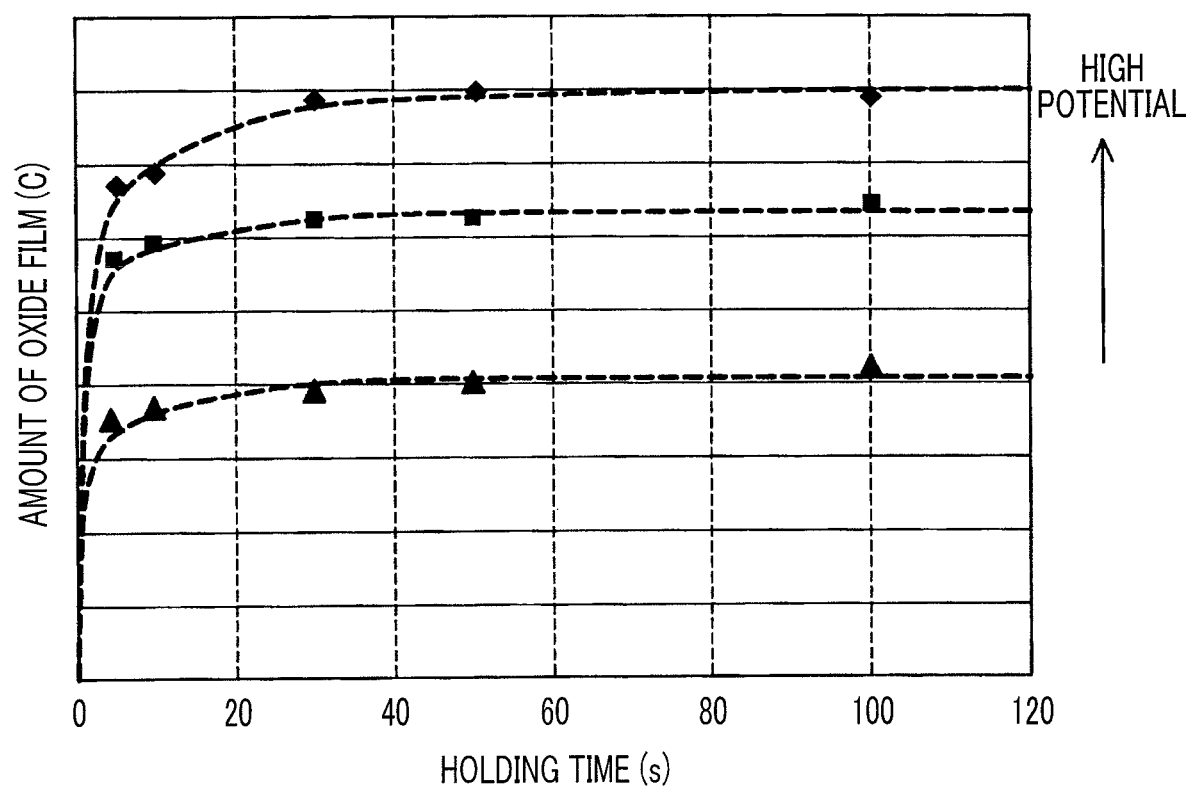
FIG. 7 is an explanatory view showing an example of the first relationship.

FIGS. 6A and 6B are explanatory views showing an example of the method of obtaining the first relationship, and FIG. 7 is an explanatory view showing an example of the first relationship. As shown in FIG. 6A, in order to obtain the first relationship, the oxide film on the cathode is entirely removed once, and thereafter, the cathode potential is held for a while in a state of being an intermediate potential at which neither oxidation nor reduction of the catalyst proceeds (hereinafter, the state described above is also referred to as "intermediate state"). The output voltage of the fuel cell 100 is increased to cause the cathode potential to increase from the intermediate potential to the oxidation potential and is held for a specific time to form an oxide film. Thereafter, the output voltage held as described above is gradually decreased, and the amount of the oxide film formed on the cathode is calculated. The first relationship is obtained by performing the process described above with variations in the combination of the output voltage and the holding time.

FIG. 6A shows, as an example, temporal changes in the output voltage (cathode potential) and the output current of the fuel cell 100 when the output voltage (the output voltage per unit cell, equivalent to the cathode potential) is set to 0.85 V and the holding time is set to 100 seconds during the formation of the oxide film. In this embodiment, by setting the output voltage to a voltage as low as 0.1 V or lower, a process of varying the output voltage between a voltage as low as 0.1 V or lower and a voltage as high as 0.85 V or higher is performed several times before the process of removing the entire oxide film once. Accordingly, substances (for example, organic substances) other than the oxide film adhering onto the cathode are removed, thereby achieving the improvement in the measurement accuracy.

FIG. 6B is an enlarged view of a region a surrounded by the broken line in FIG. 6A and shows a method of obtaining the amount of the oxide film formed on the cathode. After the output voltage of the fuel cell 100 is increased and is held for a specific time in a state in which the cathode reaches the oxidation potential, when the output voltage is gradually decreased, the formed oxide film is reduced. When the output voltage is decreased as described above, the output voltage soon enters a state in which the cathode potential becomes the intermediate potential described above. Reduction of the oxide film proceeds until the output voltage decreases to the intermediate potential after the start of the decrease in the output voltage. In FIG. 6B, the output current of the fuel cell 100 when the cathode potential reaches the intermediate potential is shown as a current value $A_1$. In the graph showing the output current in FIG. 6B, the area of a region (the area of a hatched region in FIG. 6B) enclosed between a portion from the start of the decrease in the voltage to the decrease of the output voltage to the intermediate potential and the straight line representing the current value $A_1$ represents a charge amount associated with the reaction for reducing the oxide film. Therefore, by obtaining the area of the hatched portion, that is, by integrating the difference between the current value $A_1$ and the output current from the start of the decrease in the voltage to the decrease of the output voltage to the intermediate potential, the amount of the oxide film formed can be obtained as a charge amount corresponding to the reaction amount of the oxidation reaction that has proceeded during the formation of the film.

FIG. 7 shows the first relationship, and shows results of obtaining the amount of the oxide film formed by variously changing the combination of the output voltage and the holding time as shown in FIGS. 6A and 6B. In FIG. 7, the horizontal axis represents the holding time, and the vertical axis represents the amount of the oxide film formed. In FIG. 7, as an example, the relationship between the holding time and the amount of the oxide film formed at three output voltages as output voltages when the voltage is held. The first storage portion stores, as the first relationship, the relationship between the holding time and the amount of the oxide film formed over the entire range normally usable as the output voltage of the fuel cell 100. As shown in FIG. 7, the higher the output voltage at the time of holding the voltage (the higher the cathode potential), the larger the amount of the oxide film when formation of the oxide film is saturated. It can be seen from FIG. 7 that the time until the amount of the oxide film is saturated is the same even when the output voltage at the time of holding the voltage is different (in this specification, "the same" means "substantially the same").

D. Second and Third Relationships

The second relationship used for calculating the formed film amount in step S100 is, as described above, the relationship among the output voltage (cathode potential) of the fuel cell 100, the holding time during which the output voltage is held at a constant value, and the amount of the oxide film removed. The third relationship used for calculating the refresh voltage in step S130 is the relationship among the refresh voltage, the refresh time, and the amount of the oxide film removed by the refresh process.

Removal of the oxide film by the refresh process is different from a case where the oxide film on the cathode is removed during the normal operation or the intermittent operation, and proceeds by forcibly decreasing the output voltage of the fuel cell 100. Even in a case where the output voltage of the fuel cell 100 is decreased according to a load demand, and even in a case where the output voltage is forcibly decreased, the amount of the oxide film removed is determined similarly depending on the output voltage (cathode potential) of the fuel cell 100 and the holding time during which the output voltage is held at a constant value. Therefore, in this embodiment, the second relationship and the third relationship are stored as a common map. That is, the second relationship can be understood from the third relationship shown in FIG. 5 by reading the refresh time as a reduction time, reading the refresh voltage as a reduction voltage, and the amount of the oxide film removed by the refresh process as an amount of a film removed during electric power generation. However, since a relatively short time is set as the refresh time, a part of the second relationship is used as the third relationship. Hereinafter, the method of obtaining the second and third relationships will be described.

Figure 8:
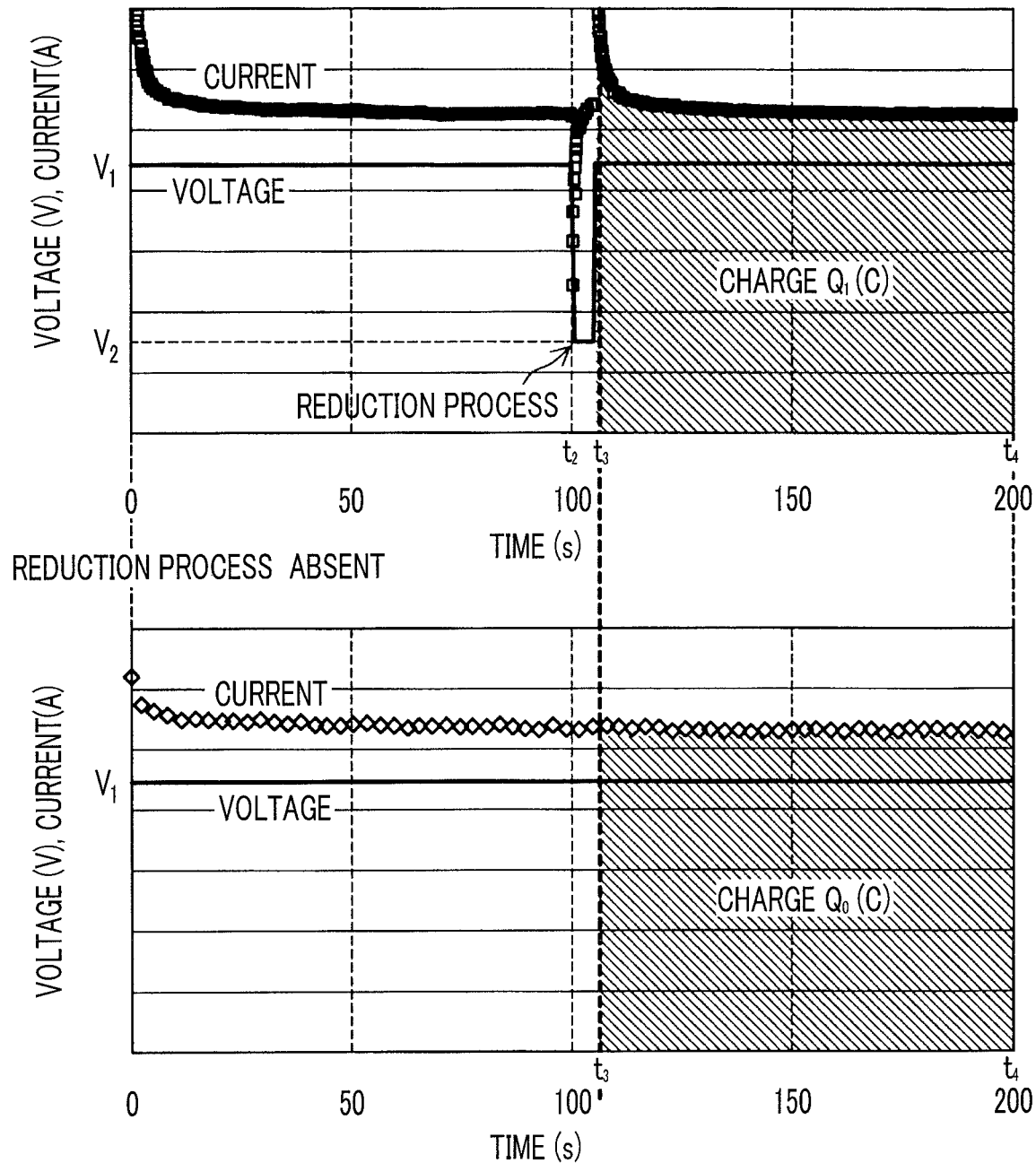
FIG. 8 is an explanatory view showing an example of a method of obtaining second and third relationships.

FIG. 8 is an explanatory view showing an example of the method of obtaining the second and third relationships. In order to obtain the second and third relationships, as shown in FIG. 8, electric power generation according to a first electric power generation pattern with a reduction process and electric power generation according to a second electric power generation pattern without a reduction process are performed, and results of both are compared to each other. Specifically, in the first electric power generation pattern, after the output voltage (cathode potential) of the fuel cell 100 is held at a voltage $V_1$ which is a constant value corresponding to the oxidation potential, a process of decreasing the output voltage to a voltage $V_2$, which is a constant value corresponding to the reduction voltage, at time $t_2$ and holding the voltage until time $t_3$ is performed as the reduction process. Thereafter, the output voltage is increased again to the voltage $V_1$ and is held until time $t_4$ at which the current value is sufficiently stabilized. Time $t_2$ from the start of electric power generation to the start of the reduction process is determined as a time at which the amount of the oxide film formed on the cathode is saturated. Time $t_4$ until the current value is sufficiently stabilized after the reduction process may be appropriately set depending on the configuration of the fuel cell 100 that is used, and the like. In the first electric power generation pattern with the reduction process shown in FIG. 8, the reduction process is started 100 seconds after the start of electric power generation (time $t_2$=100 seconds), the reduction process is performed for five seconds ($t_3-t_2$=five seconds), and thereafter the output voltage is increased to the voltage $V_1$ and is held at the voltage $V_1$ until 200 seconds elapse from the start of electric power generation (time $t_4$=200 seconds).

Contrary to this, in the second electric power generation pattern, using the fuel cell 100 having the same configuration as the first electric power generation pattern, the output voltage is held at the voltage $V_1$ until $t_4$ from the start of electric power generation.

In FIG. 8, in the first electric power generation pattern, a region corresponding to an integrated value of the current value from the end of the reduction process at time $t_3$ to time $t_4$ is hatched and is shown as a charge $Q_1$ (the unit is Coulomb). In the second electric power generation pattern, a region corresponding to an integrated value of the current value from time $t_3$ to time $t_4$ is hatched and is shown as a charge $Q_0$ (the unit is Coulomb). $\Delta Q$, which is the difference obtained by subtracting the charge $Q_0$ from the charge $Q_1$ is considered as representing the amount of current flowing by a reaction in which the oxide film is reduced by the reduction process. Therefore, by obtaining $\Delta Q$, the amount of the oxide film removed when the reduction process is performed at the voltage $V_2$ for the holding time ($t_3-t_2$) can be calculated as the charge amount corresponding to the reaction amount of the reduction reaction that has proceeded during the removal of the oxide film. As described above, by measuring the amount of the oxide film removed by variously changing the voltage ($V_2$) of the reduction process and the holding time ($t_3-t_2$) of the reduction process, the second and third relationships as shown in FIG. 5 can be obtained.

E. Relationship Between Refresh Time and Decrease in Battery Performance

In the refresh process, as described above, the longer the refresh time, and the lower the refresh voltage, the larger the amount of the oxide film removed. Even under the refresh conditions on the same film removal amount equivalent line, the refresh time greatly affects the decrease in the battery performance (deterioration of the cathode).

Figure 9:
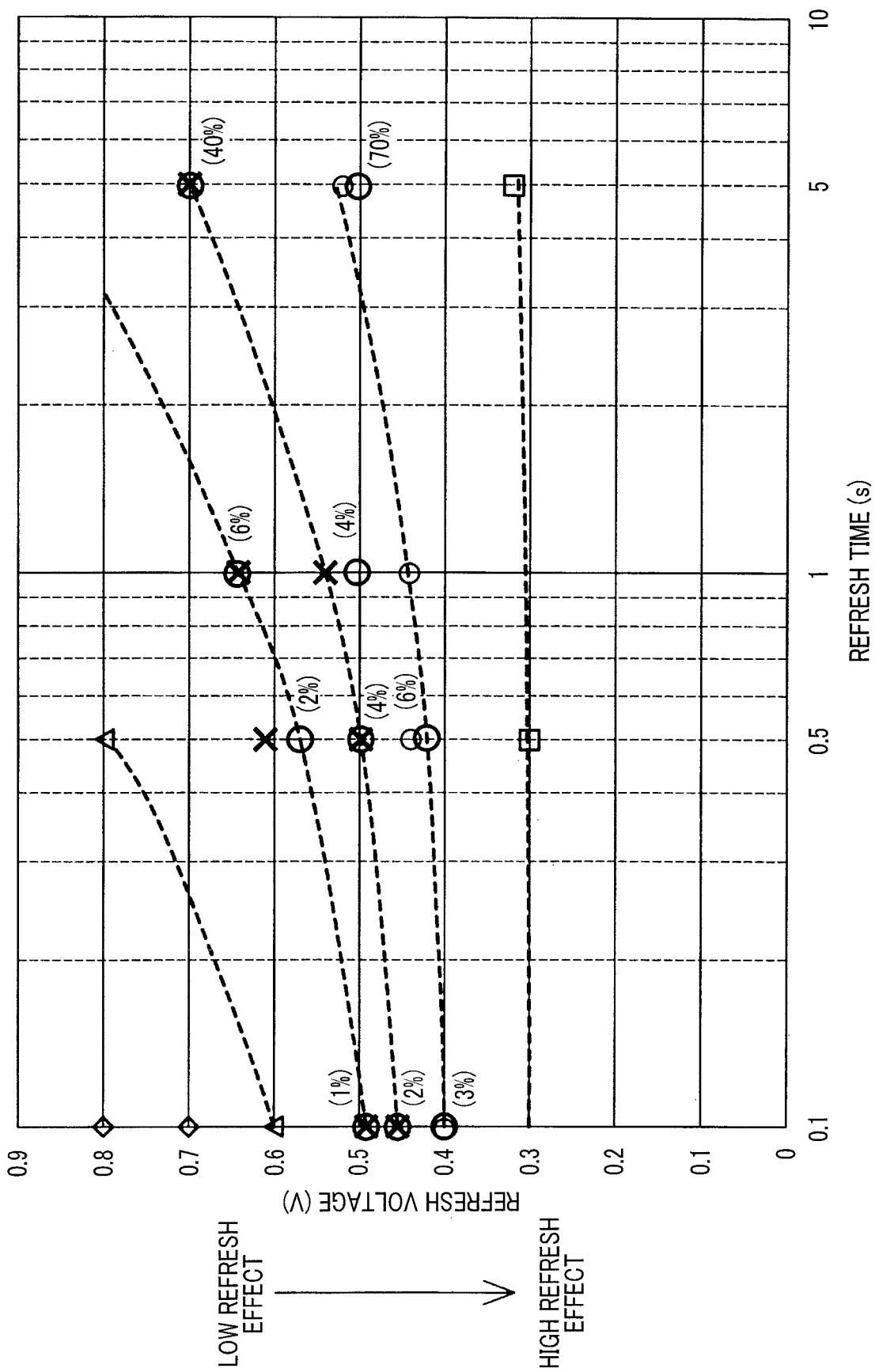
FIG. 9 is an explanatory view showing an example of the third relationship together with a result of a durability test.

FIG. 9 is a view showing results (third relationship) of obtaining the amount of the oxide film removed using the method shown in FIG. 8 by variously changing the refresh time and the refresh voltage. In FIG. 9, as in FIG. 5, the horizontal axis represents the refresh time, and the vertical axis represents the refresh voltage per unit cell. The horizontal axis is scaled logarithmically. FIG. 9 further shows results of a durability test under various refresh conditions. In the durability test, a test of repeating the refresh process 430,000 times was performed under each of the refresh conditions, and a maximum output decrease ratio after the durability test to before the durability test (the ratio of the difference in the maximum value of the output electric power of the fuel cell 100 between before the durability test and after the durability test to the maximum value of the output electric power before the durability test) was examined.

As shown in FIG. 9, even on the same film removal amount equivalent line, the maximum output decrease ratio obtained as a result of the durability test varies depending on the refresh condition. As shown in FIG. 9, it is extremely effective to shorten the refresh time in order to suppress a decrease in the maximum output decrease ratio. A reference time for determining the refresh time is desirably determined so that the maximum output decrease ratio is less than 10% regardless of the refresh voltage. The degree to which the maximum output decrease ratio is increased by lengthening the refresh time varies depending on the specific configuration of the fuel cell 100. However, from the viewpoint of suppressing the maximum output decrease ratio to a low level (although not particularly limited, the maximum output decrease ratio is desirably suppressed to less than 10%), although not particularly limited, the reference time for determining the refresh time as described above is desirably 1.0 second or shorter, more desirably 0.5 seconds or shorter, and even more desirably 0.1 seconds or shorter. From the viewpoint of suppressing the maximum output decrease ratio to a low level, although not particularly limited, it is most desirable that the refresh time is the shortest refresh time described above.

F. Relationship Between Refresh Voltage and Decrease in Battery Performance

As shown in FIGS. 5 and 9, when the refresh time is the same, the lower the refresh voltage, the larger the amount of the oxide film removed. However, in a case where the refresh voltage is excessively low, the cathode is damaged to an undesirable degree in some cases. In this embodiment, from the viewpoint of suppressing the damage of the cathode due to an excessive decrease in the refresh voltage, a refresh lower limit voltage is determined in advance as a reference voltage regarding the lower limit of the refresh voltage. The refresh lower limit voltage is hereinafter also referred to as "lower limit voltage". In this embodiment, the refresh lower limit voltage is set based on the result of the durability test as shown in FIG. 9.

In this embodiment, the refresh lower limit voltage is set so that the deterioration of the cathode (decrease in the electric power generation performance) falls within an allowable range when the durability test of repeating the refresh process by setting the refresh time to the shortest refresh time described above is conducted. Specifically, for example, the refresh lower limit voltage is set so that the maximum output decrease ratio becomes less than 10% when the durability test is conducted by setting the refresh time to the shortest refresh time. FIG. 9 shows that the maximum output decrease ratio becomes 3% or less in a case where the refresh voltage is set to 0.4 V or more when the refresh time is set to the shortest refresh time (0.1 seconds). In FIG. 9, when the refresh voltage is 0.3 V, the deterioration of the cathode proceeds, so that the refresh process cannot be normally repeated in the middle of the durability test. In this embodiment, as an example, the refresh lower limit voltage is set to 0.4 V.

When the durability test is conducted by setting the refresh time to the shortest refresh time as described above, for example, at a voltage in a range from 0.3 V to 0.4 V, a voltage point at which the result when the refresh voltage is set significantly changes may be present. When the refresh voltage is set to a voltage higher than the voltage point mentioned above, relatively high electric power generation performance is exhibited even after the durability test. However, when the refresh voltage is set to a voltage equal to or lower than the voltage point, deterioration of the cathode proceeds, and the refresh process cannot be normally repeated in the middle of the durability test. The refresh lower limit voltage may be set to a voltage value higher than the voltage point mentioned above. In this case, the maximum output decrease ratio when the durability test is conducted by setting the refresh time to the shortest refresh time may exceed 10%.

G. Deterioration Suppression Film Amount

Hereinafter, the deterioration suppression film amount ($\theta_1$) will be described. In this embodiment, as described above, in order to suppress the deterioration of the cathode due to an excessive removal amount of the oxide film by the refresh process, the deterioration suppression film amount ($\theta_1$) is set as the amount of the oxide film to remain after the refresh process.

In this embodiment, as shown in Expression (1), the deterioration suppression film amount ($\theta_1$) is a value obtained by subtracting a removal amount maximum value ($\theta_2$), which is the maximum amount of the oxide film which may be removed by the refresh process, from a maximum film amount ($\theta_{max}$), which is the maximum value of the amount of the oxide film formed on the cathode. In this embodiment, the removal amount maximum value ($\theta_2$) is used as the amount of the oxide film removed by the refresh process when the refresh voltage is set to the refresh lower limit voltage described above and the refresh time is set to the shortest refresh time described above.

$$\theta_1 = \theta_{max} - \theta_2 \qquad (1)$$

Figure 10:
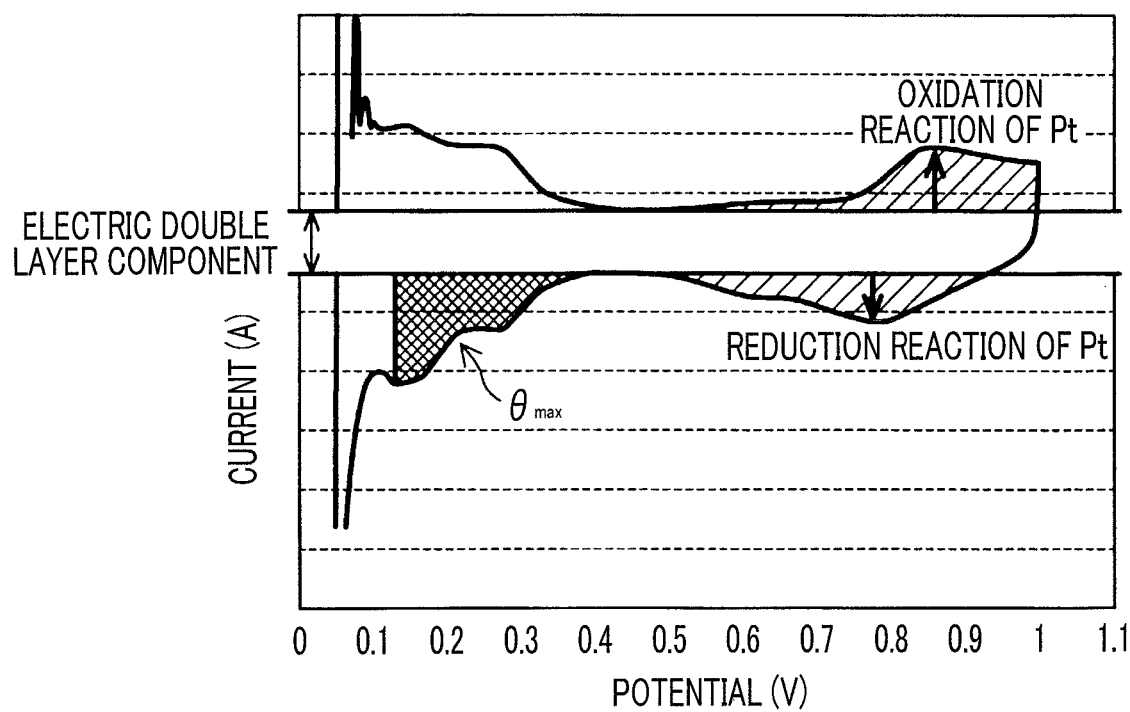
FIG. 10 is a view showing a cyclic voltammogram of a fuel cell.

FIG. 10 is a view showing a cyclic voltammogram of the fuel cell 100. The maximum film amount ($\theta_{max}$) will be described with reference to FIG. 10. In the cyclic voltammogram in FIG. 10, in addition to a region corresponding to each of the oxidation reaction (oxide film formation reaction) of the catalyst (in FIG. 10, platinum catalyst) and the reduction reaction of the (oxide film removal reaction) of the catalyst, a region corresponding to the maximum film amount $\theta_{max}$ is hatched. The region corresponding to the maximum film amount $\theta_{max}$ shown in FIG. 10 represents a hydrogen adsorption electricity quantity, and corresponds to an electrochemical effective area in the catalyst. Therefore, the maximum film amount $\theta_{max}$ can be obtained as the charge amount corresponding to the reaction amount of the reaction in which the maximum amount of the oxide film is formed on the cathode, from the area of the region corresponding to the maximum film amount $\theta_{max}$.

With the fuel cell system 30 of this embodiment configured as described above, when the refresh process is performed, the refresh voltage is determined so that removal of the amount of the oxide film calculated in step S120 can be performed within the preset reference time. Therefore, compared to a case where the calculated amount of the oxide film is removed by the refresh process for a longer period of time, deterioration of the cathode due to the refresh process can be suppressed, and as a result, the decrease in the electric power generation performance of the fuel cell 100 due to the refresh process can be suppressed.

As shown in FIGS. 5 and 9, it is possible to set the refresh condition as any point on the film removal amount equivalent line corresponding to the amount by which the oxide film is to be removed. As shown in FIG. 9, even under the refresh condition on the same film removal amount equivalent line, as the refresh time decreases, the result of the durability test of the fuel cell 100 is further improved. It is considered that the reason why the electric power generation performance decreases as the refresh time increases is that as the refresh time increases, the degree to which the oxide of the catalyst present inside the cathode as well as the oxide of the catalyst (platinum or the like) present on the surface of the cathode is reduced during the refresh process increases. It is considered that the structure of the cathode is damaged by the reduction of the oxide present inside the cathode and thus the electric power generation performance of the fuel cell 100 decreases.

In a case where the amount of the oxide film removed by the refresh process is the same, by setting the refresh time to be shorter, the refresh voltage further decreases, so that the amount of electric power generated during the refresh process further increases. In this embodiment, the refresh process is performed at the time of the end of the intermittent operation. Normally, after the end of the intermittent operation, an electric power demanded by the motor 170 is present. Therefore, as described above, as the amount of electric power generated during the refresh process increases, an excessive decrease in the remaining capacity of the secondary battery 172 can be suppressed. From the viewpoint described above, although not particularly limited, the refresh time is desirably 0.5 seconds or shorter, and more desirably 0.1 seconds or shorter.

In this embodiment, the amount by which the oxide film is to be removed from the cathode when the refresh process is performed so as to cause a portion of the oxide film to remain on the cathode after the refresh is calculated. Therefore, a progress of the deterioration of the cathode due to the amount of the oxide excessively removed from the cathode by the refresh process and the decrease in the electric power generation performance of the fuel cell 100 can be suppressed.

In this embodiment, particularly, in order to set the amount of the oxide film to remain after the refresh process (deterioration suppression film amount), the refresh condition in which the refresh time is the shortest refresh time in the system and the refresh voltage is the refresh lower limit voltage (in this embodiment, 0.4 V) which becomes the allowable range of the cathode deterioration (the result of the durability test) when the refresh process is performed within the shortest refresh time is used. The amount of the oxide film to remain after the refresh process (deterioration suppression film amount) is set by subtracting the amount of the oxide film removed when the refresh process is performed under the refresh condition from the maximum film amount. As shown in FIG. 9, when the refresh time is set to the shortest refresh time, in a case where a larger amount of the oxide film is removed by performing the refresh process at a refresh voltage set to a voltage lower than the refresh lower limit voltage (in FIG. 8, an example in which the refresh lower limit voltage is 0.3 V is shown), the deterioration of the cathode proceeds, and the electric power generation performance of the fuel cell 100 significantly decreases. As described above, it is considered that even in the case where the amount of the oxide removed by the refresh process is excessive, as in a case where the refresh time is long, the degree to which the oxide of the catalyst present inside the cathode is reduced increases, and thus the deterioration of the cathode proceeds. An effect of suppressing the deterioration of the cathode due to the refresh process can be increased by performing the refresh process so as to cause the deterioration suppression film amount set as described above to remain.

In this embodiment, the refresh process is performed at the time of the end of the intermittent operation. During the intermittent operation, generally, the cathode potential becomes a high potential and the oxide film is easily formed on the cathode. Therefore, the oxide film on the cathode can be efficiently removed by performing the refresh process at the time of the end of the intermittent operation. For example, the refresh process may be performed in the middle of an operation state in which a load demand from the motor 170 is present. However, by performing the refresh process at the time of the end of the intermittent operation, as described above, it is possible to suppress an excessive decrease in the remaining capacity of the secondary battery 172.

H. Other Embodiments

When the refresh voltage is determined in step S130 in this embodiment, a minimum refresh voltage ($V_{min}$) may be provided to set the refresh voltage to be equal to or higher than the minimum refresh voltage ($V_{min}$). For example, the minimum refresh voltage can be the refresh lower limit voltage described above, that is, the refresh lower limit voltage (in this embodiment, 0.4 V) which is the lower limit of the output voltage which becomes the allowable range of the cathode deterioration (the result of the durability test) when the refresh process is performed within the shortest refresh time at the refresh voltage by setting the refresh time to the shortest refresh time in the system. For example, referring to FIG. 5, when the amount by which the oxide film is to be removed calculated in step S120 is 10 C, as the refresh condition, a condition P3 in which the refresh voltage becomes the minimum refresh voltage ($V_{min}$) may be adopted instead pf a condition P4 in which the refresh time is the shortest refresh time (0.1 seconds) and the refresh voltage is lower than the minimum refresh voltage ($V_{min}$). Accordingly, deterioration of the cathode due to an excessively low refresh voltage can be suppressed.

In this embodiment, in order to determine the refresh voltage in step S130, the third relationship which is the relationship among the output voltage of the fuel cell 100 when the refresh process is performed, the refresh time, and the amount of the oxide film removed by the refresh process is stored and is referred to. However, another configuration may also be adopted. For example, the refresh time may be fixed to the shortest refresh time (for example, 0.1 seconds), the relationship among the refresh voltage during the shortest refresh time and the amount of the oxide film removed by the refresh process may be stored, and referring to this, the refresh voltage may be determined. At this time, for example, when the refresh time is set to the shortest refresh time, the refresh voltage may be fixed to the minimum refresh voltage ($V_{min}$) regarding the amount of the oxide film caused by the refresh voltage which is lower than the minimum refresh voltage ($V_{min}$) described above, and the relationship between the refresh time and the amount of the oxide film may be stored.

In this embodiment, the fuel cell system 30 is used as a power source for driving a vehicle, but may be used in a different configuration. The fuel cell system may be used as a power source for driving a moving body other than a vehicle or may also be used as a stationary power source.

The disclosure is not limited to this embodiment, and can be realized in various configurations without departing from the gist thereof. For example, the technical features in the embodiments corresponding to the technical features in each of embodiments described in "SUMMARY" may be appropriately replaced or combined in order to solve some or all of the problems described above or achieve some or all of the effects described above. The technical features can be appropriately deleted as long as the technical features are not described as being indispensable in this specification.

What is claimed is:

1. A fuel cell system comprising:
   a fuel cell including an electrolyte membrane, an anode, and a cathode;
   a voltage regulator configured to regulate an output voltage of the fuel cell; and
   a controller programmed to perform a refresh process of decreasing the output voltage of the fuel cell to a reduction voltage at which an oxide film formed on the cathode is reduced, by controlling the voltage regulator, wherein:
   the controller is programmed to, before the refresh process, calculate a first amount based on the output voltage of the fuel cell and a time, the first amount being an amount by which the oxide film is to be removed from the cathode,
   the controller is programmed to, before the refresh process, determine, as the output voltage of the fuel cell, a refresh voltage that enables the first amount of the oxide film to be removed within a preset reference time, based on a predetermined relationship between the refresh voltage, a refresh time, and the first amount of the oxide film to be removed, the refresh time being equal to or shorter than the preset reference time, and
   the controller is programmed to operate the voltage regulator so as to cause the output voltage of the fuel cell to become the refresh voltage when the refresh process is performed.

2. The fuel cell system according to claim 1, wherein the controller is programmed to calculate the first amount such that a portion of the oxide film formed on the cathode before the refresh process is performed remains on the cathode after the refresh process is performed.

3. The fuel cell system according to claim 2, wherein the controller is programmed to
   calculate a second amount that is the amount of the oxide film that has been formed on the cathode, and
   calculate the first amount by subtracting a third amount from the second amount, the third amount being determined in advance as an amount of the portion of the oxide film that is to remain after the refresh process to suppress deterioration of the cathode due to an excessive removal of the oxide film by the refresh process.

4. The fuel cell system according to claim 3, wherein the controller is programmed to calculate the third amount by subtracting an amount by which the oxide film is removed from the cathode when the refresh process is performed at a predetermined lower limit voltage and for a predetermined lower limit time, from a maximum value of an amount of the oxide film formed on the cathode.

5. The fuel cell system according to claim 2, further comprising:
   a voltage sensor configured to detect the output voltage of the fuel cell;
   a timer configured to measure a holding time during which the output voltage of the fuel cell is held at a constant value;
   a first storage portion configured to store a first relationship that is a relationship among the output voltage of the fuel cell, the holding time, and an amount of the oxide film formed; and
   a second storage portion configured to store a second relationship that is a relationship among the output voltage of the fuel cell, the holding time, and an amount by which the oxide film is removed,
   wherein the controller is programmed to calculate the second amount by calculating and integrating the amount of the oxide film formed on the cathode and the amount by which the oxide film is removed from the cathode with time based on the detected output voltage, the measured holding time, the first relationship, and the second relationship.

6. The fuel cell system according to claim 1, further comprising
   a third storage portion configured to store a third relationship that is a relationship among the output voltage of the fuel cell when the refresh process is performed, a time during which the refresh process is performed, and an amount by which the oxide film is removed by the refresh process,
   wherein the controller is programmed to determine, based on the third relationship, the refresh voltage that enables the first amount of the oxide film to be removed from the cathode within the reference time.

* * * * *